US010785955B2

(12) United States Patent
Alford

(10) Patent No.: US 10,785,955 B2
(45) Date of Patent: Sep. 29, 2020

(54) INSECT-FREE PET FEEDER SYSTEM

(71) Applicant: Lisa Alford, Liberty, TX (US)

(72) Inventor: Lisa Alford, Liberty, TX (US)

( * ) Notice: Subject to any disclaimer, the term of this patent is extended or adjusted under 35 U.S.C. 154(b) by 0 days.

(21) Appl. No.: 15/691,699

(22) Filed: Aug. 30, 2017

(65) Prior Publication Data

US 2018/0055006 A1 Mar. 1, 2018

Related U.S. Application Data

(60) Provisional application No. 62/381,564, filed on Aug. 30, 2016.

(51) Int. Cl.
*A01K 7/00* (2006.01)
*A01K 5/00* (2006.01)

(52) U.S. Cl.
CPC . *A01K 5/00* (2013.01); *A01K 7/00* (2013.01)

(58) Field of Classification Search
CPC .......... A01K 5/0142; A01K 7/02; A01K 7/00; A01K 5/0121; A01K 5/0135; A01K 5/0225; A01K 7/005
USPC ........................... 119/51.5, 61.53, 77, 72, 74
See application file for complete search history.

(56) References Cited

U.S. PATENT DOCUMENTS

| 4,357,905 | A | | 11/1982 | Carpenter | |
|---|---|---|---|---|---|
| 5,245,948 | A | * | 9/1993 | McClellan | ........... A01K 5/0142 119/51.5 |
| 5,259,336 | A | * | 11/1993 | Clark | ........................ A01K 7/00 119/51.5 |
| 5,277,149 | A | | 1/1994 | East | |
| 5,485,806 | A | | 1/1996 | Watanabe | |
| 5,564,363 | A | | 10/1996 | Soffici | |
| 5,577,461 | A | * | 11/1996 | Sebastian | ............. A01K 5/0121 119/51.5 |
| 5,730,082 | A | * | 3/1998 | Newman | ............. A01K 5/0142 119/51.5 |
| 6,101,974 | A | * | 8/2000 | Frohlich | .................. A01K 7/00 119/51.5 |
| 6,119,628 | A | * | 9/2000 | Lorenzana | ............... A01K 7/02 119/77 |
| 6,142,099 | A | * | 11/2000 | Lange, Jr. | ............ A01K 5/0142 119/51.5 |
| D497,224 | S | * | 10/2004 | Remy | ......................... D30/121 |
| 7,284,499 | B1 | * | 10/2007 | Kuster | ................. A01K 5/0114 119/51.5 |
| 2006/0144340 | A1 | * | 7/2006 | Burge | .................. A01K 5/0121 119/61.5 |
| 2009/0056633 | A1 | | 3/2009 | McDaniel et al. | |

(Continued)

*Primary Examiner* — Yvonne R Abbott-Lewis
(74) *Attorney, Agent, or Firm* — Runyan Law; Charles Runyan

(57) ABSTRACT

An insect-free pet feeder system includes a feeder assembly having a base, a water-cavity, a pet-food-cavity, a bowl insert, and a water bottle. The feeder assembly includes the base, the water-cavity, the pet-food-cavity, the bowl insert, and the water bottle creating a unitary structure. The base supports the water-cavity, the pet-food-cavity, the bowl insert, and the water bottle. The water-cavity surrounds the pet-food-cavity. The bowl insert is supported within the pet-food-cavity. The water bottle is provided to replenish the water-cavity with water and maintain a water level. The water-cavity creates a moat barrier between insects and pet food stored in the bowl insert located within the pet-food-cavity and ensures pets have access to clean, insect-free food.

18 Claims, 5 Drawing Sheets

(56) References Cited

U.S. PATENT DOCUMENTS

| | | | |
|---|---|---|---|
| 2011/0283948 A1* | 11/2011 | Wong | A01K 7/00 119/74 |
| 2015/0068464 A1* | 3/2015 | Worry | A01K 7/005 119/72 |
| 2015/0096649 A1* | 4/2015 | Lathim | A01K 5/0114 141/324 |
| 2016/0219832 A1* | 8/2016 | Langston | A01K 5/0142 |
| 2017/0325421 A1* | 11/2017 | Do | A01K 5/0142 |

* cited by examiner

INSECT-FREE PET FEEDER SYSTEM

CROSS REFERENCE TO RELATED APPLICATION

The present application is related to and claims priority to U.S. Provisional Patent Application No. 62/381,564 filed Aug. 30, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of containers and more specifically relates to a pet food dish.

2. Description of Related Art

A bowl is a round, open-top container used to serve food. Pet bowls or dishes are specifically for pet food so that a pet may eat at their discretion, or on a specific schedule chosen by the owner. Pet bowls are often left uncovered, and may attract unwanted pests. Ants and other insects are prone to crawling into and contaminating outdoor pet food bowls. When this happens, pet owners have to throw away the food and refill the bowl with fresh food, only for the ants to return. Additionally, pet owners are constantly filling and refilling their pet's outdoor water bowl, which can be inconvenient, expensive, and time consuming. A suitable solution is desired.

U.S. Pat. No. 5,564,363 to Alex R. Soffici relates to a pet food dish with crawling insect barriers. The described pet food dish with crawling insect barriers includes a single piece, single mold pet food dish designed for adaptation to out of doors environments where ants and other crawling insects tend to infect and degrade the food therein has a water moat barrier formed between corrugated and alternating ridged rims, thereby effecting a superior elevational barrier to insect travel. In a preferred embodiment, a fluid inlet and fluid outlet port are provided to allow water in the moat to be in constant circulation.

BRIEF SUMMARY OF THE INVENTION

In view of the foregoing disadvantages inherent in the known container art, the present disclosure provides a novel insect-free pet feeder system. The general purpose of the present disclosure, which will be described subsequently in greater detail, is to provide an insect proof pet dish for providing pets with clean, insect-free food.

An insect-free pet feeder system is disclosed herein. The insect-free pet feeder system includes a feeder assembly having a base, a water-cavity, a pet-food-cavity, a bowl insert, and a water bottle (container). The insect-free pet feeder system comprises the feeder assembly. The feeder assembly comprises the base, the water-cavity, the pet-food-cavity, the bowl insert, and the water bottle in functional combination creating a unitary structure. The base supports the water-cavity, the pet-food-cavity, the bowl insert, and the water bottle. The water-cavity surrounds the pet-food-cavity. The pet-food-cavity is configured to receive the bowl insert. The water bottle may be secured to the water-cavity and the pet-food-cavity and is configured to replenish the water-cavity with water and maintain a water level. The water-cavity is configured to provide a moat barrier between insects and pet food stored in the bowl insert located within the pet-food-cavity.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an insect-free pet feeder system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to containers and more particularly to an insect-free pet feeder system as used to improve the use of pet food dishes and prevent insects from contaminating food stored therein.

Generally, the present invention keeps ants and other 'pesky' insects from crawling into a pet's food bowl. It features an easy-to-clean, removable food bowl, water dish, and refillable water bottle that dispenses water into the water dish. This saves pet owners a considerable amount of time and frustration. It prevents wasted pet food and additional expenses to replace the wasted food. The present invention ensures beloved pets have access to clean, insect-free food.

The insect-free pet feeder system may have a rounded base with a rubber-grip bottom. The water bowl may sit inside the rounded base, and the food bowl can sit inside the water bowl, creating a 'moat' around the food bowl. The food bowl can be removed for easy refilling and cleaning and can have a rubber-grip bottom to prevent shifting and spilling. The water bottle can be threaded into a port on the side of the feeder. The water bottle can have a water-release valve to dispense water directly into the water bowl. The top of the water bottle may include a capped opening to refill the bottle with a hose. In a preferred embodiment, the base may measure approximately 18" in diameter, whereas the water bowl can measure about 14". The feeder may be offered in various materials, including stainless steel, hard plastic, or other suitable material.

Figure 1:
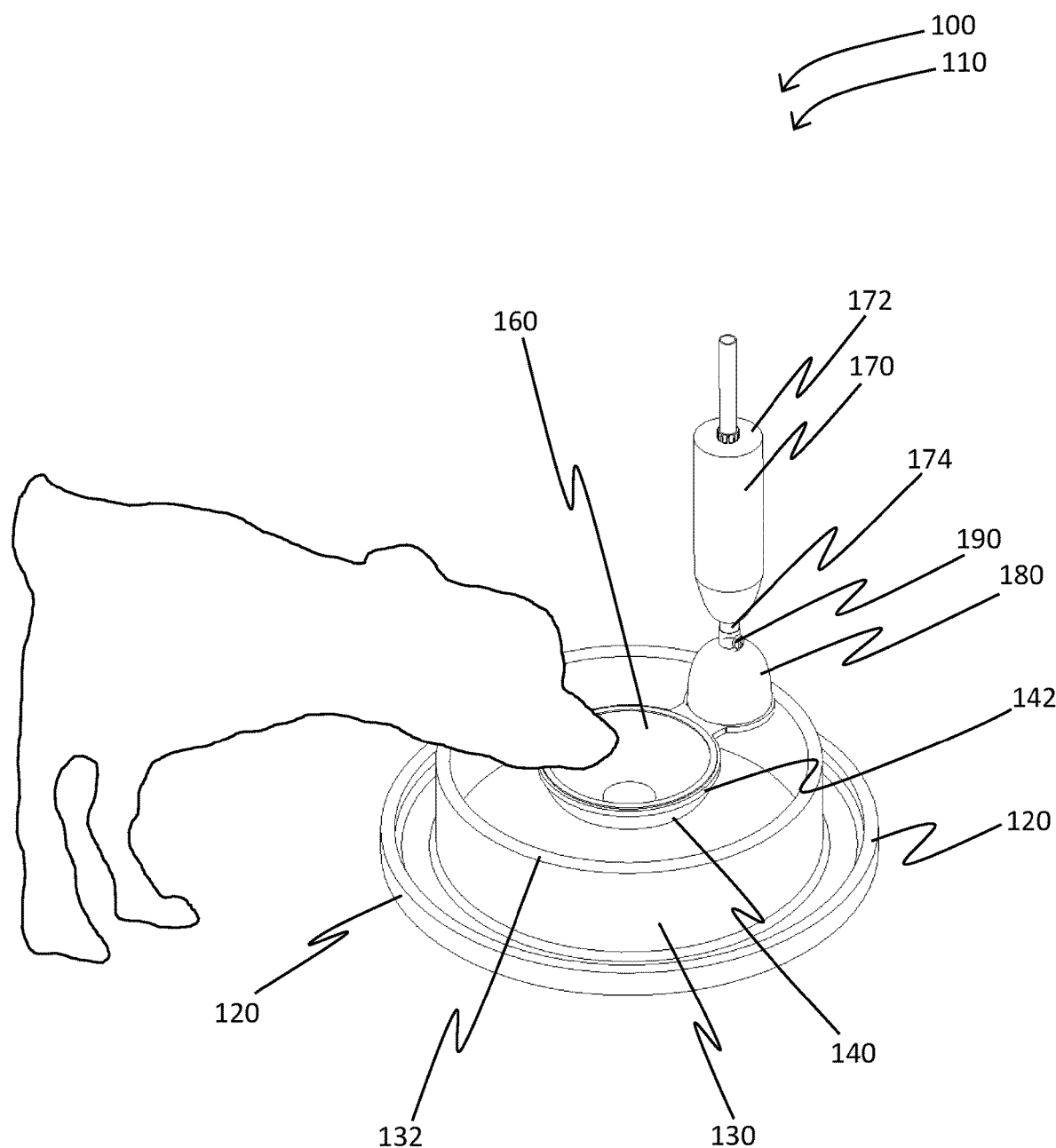
FIG. 1 is a perspective view of the insect-free pet feeder system during an 'in-use' condition, according to an embodiment of the disclosure.

Referring now more specifically to the drawings by numerals of reference, there is shown in FIGS. 1-5, various views of an insect-free pet feeder system 100. FIG. 1 shows an insect-free pet feeder system 100 during an 'in-use' condition 150, according to an embodiment of the present disclosure. As illustrated, the insect-free pet feeder system 100 may include a feeder assembly 110 having a base 120, a water-cavity 130, a pet-food-cavity 140, a bowl insert 160, and a water bottle 170. The water-cavity 130 is configured to provide a moat barrier between insects and pet food stored in the bowl insert 160 located within the pet-food-cavity 140.

Figure 2:
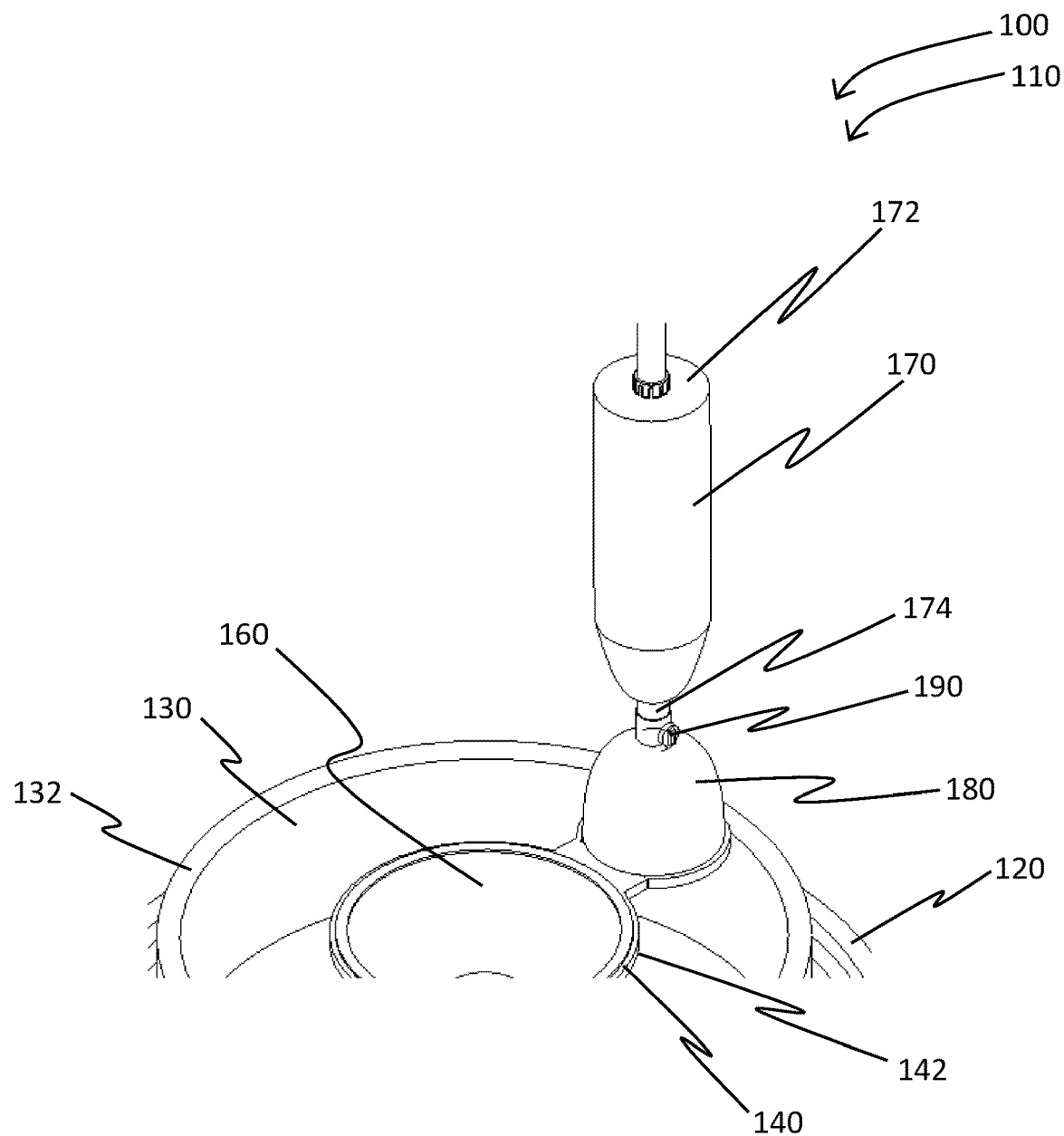
FIG. 2 is a perspective view of the insect-free pet feeder system of FIG. 1, according to an embodiment of the present disclosure.

FIG. 2 shows a perspective view of the insect-free pet feeder system 100 of FIG. 1, according to an embodiment of the present disclosure. As above, the insect-free pet feeder system 100 may include the feeder assembly 110 having the base 120, the water-cavity 130, the pet-food-cavity 140, the bowl insert 160, and the water bottle 170. The insect-free pet feeder system 100 comprises the feeder assembly 110. The feeder assembly 110 comprises the base 120, the water-cavity 130, the pet-food-cavity 140, the bowl insert 160, and the water bottle 170 in functional combination creating a unitary structure. The base 120 supports the water-cavity 130, the pet-food-cavity 140, the bowl insert 160, and the water bottle 170. The water-cavity 130 surrounds the pet-food-cavity 140. The pet-food-cavity 140 is configured to receive the bowl insert 160. The water bottle 170 is secured to the water-cavity 130 and the pet-food-cavity 140 and is configured to replenish the water-cavity 130 with water and maintain a water level.

Figure 3:
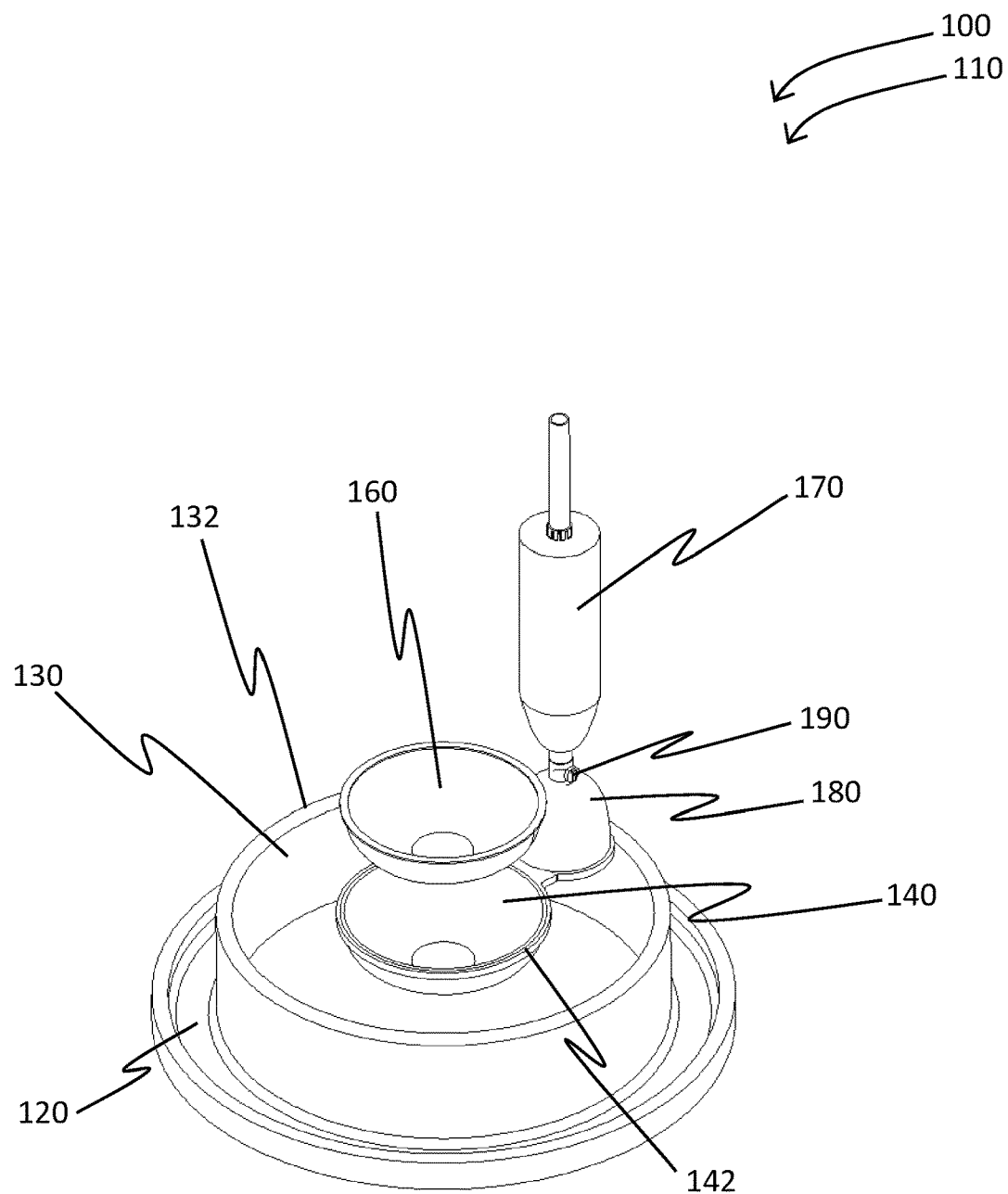
FIG. 3 is a perspective view of the insect-free pet feeder system of FIG. 1, according to an embodiment of the present disclosure.

FIG. 3 shows a perspective view of the insect-free pet feeder system 100 of FIG. 1, according to an embodiment of the present disclosure. As above, the insect-free pet feeder system 100 may include the feeder assembly 110 having the base 120, the water-cavity 130, the pet-food-cavity 140, the bowl insert 160, and the water bottle 170. An outer rim of the pet-food-cavity 142 and an outer rim of the water-cavity 132 are configured on a substantially common horizontal plane in preferred embodiments. The pet-food-cavity 140 is centrally positioned within the water-cavity 130. The pet-food-cavity 140 comprises an inner volume having a semi-spherical profile configured to receive the bowl insert 160. The bowl insert 160 is removeable.

Figure 4:
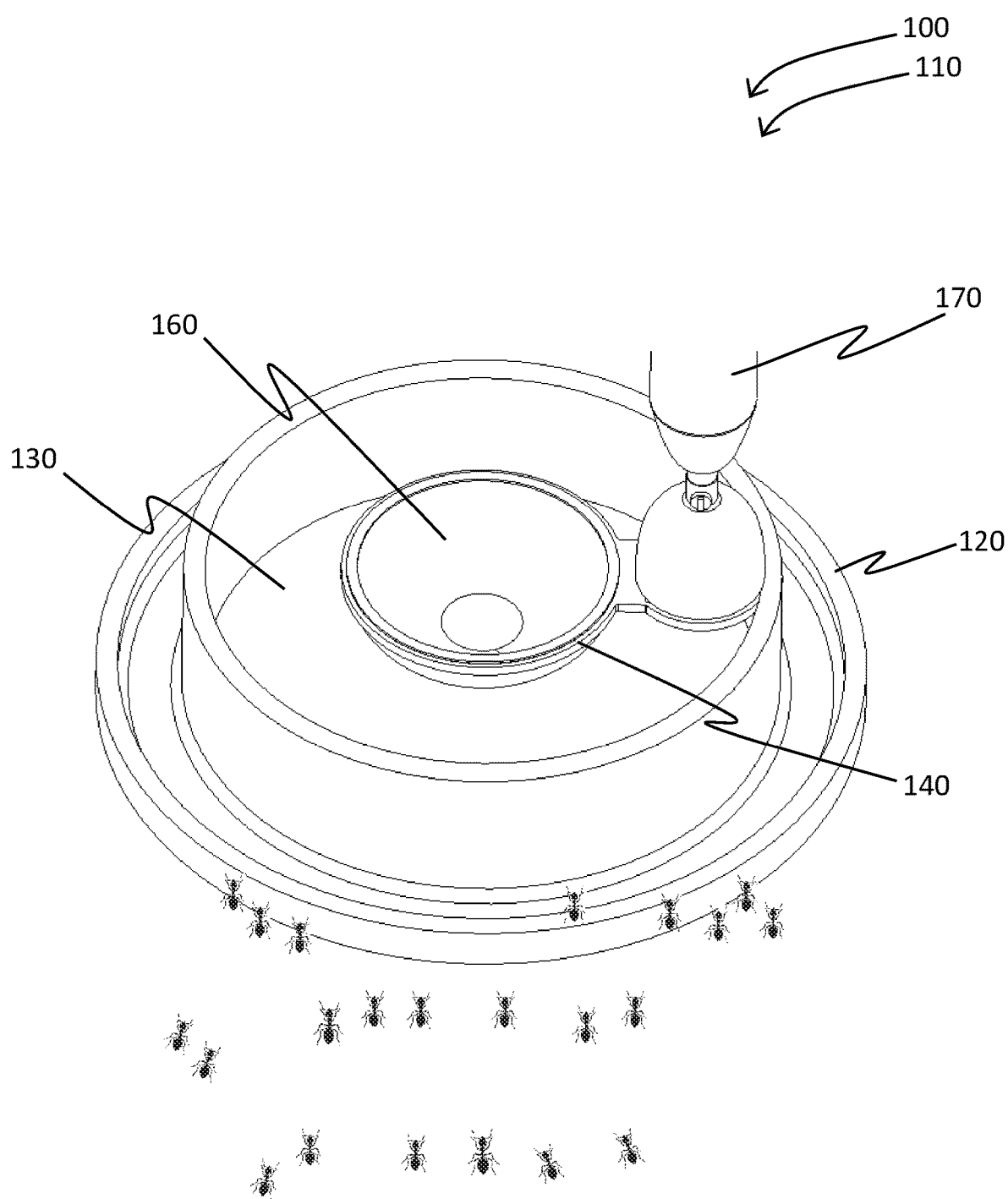
FIG. 4 is a perspective view of the insect-free pet feeder system of FIG. 1, according to an embodiment of the present disclosure.

FIG. 4 shows a perspective view of the insect-free pet feeder system 100 of FIG. 1, according to an embodiment of the present disclosure. As above, the insect-free pet feeder system 100 may include the feeder assembly 110 having the base 120, the water-cavity 130, the pet-food-cavity 140, the bowl insert 160, and the water bottle 170. The pet-food-cavity 140 is supported within the water-cavity 130 by a support-member 180. The support-member 180 further supports the water bottle 170. The support-member 180 further comprises a port 190 configured to support the water bottle 170. The water bottle 170 may be refillable. The water bottle 170 comprises an opening at a first-end 172 to refill the water bottle 170. The water bottle 170 comprises a threaded second-end 174 for coupling to the water-cavity 130 and the pet-food-cavity 140 via the port 190. The port 190 comprises a threaded-fastener for receiving the threaded second-end of the water bottle 170. The port 190 supports the water bottle 170 in an upright position allowing water to flow to the water-cavity 130. The water bottle 170 further comprises a water-release valve for dispensing the water into the water-cavity 130 and maintain the water level. The water level is below the outer rim of the pet-food-cavity 142.

Figure 5:
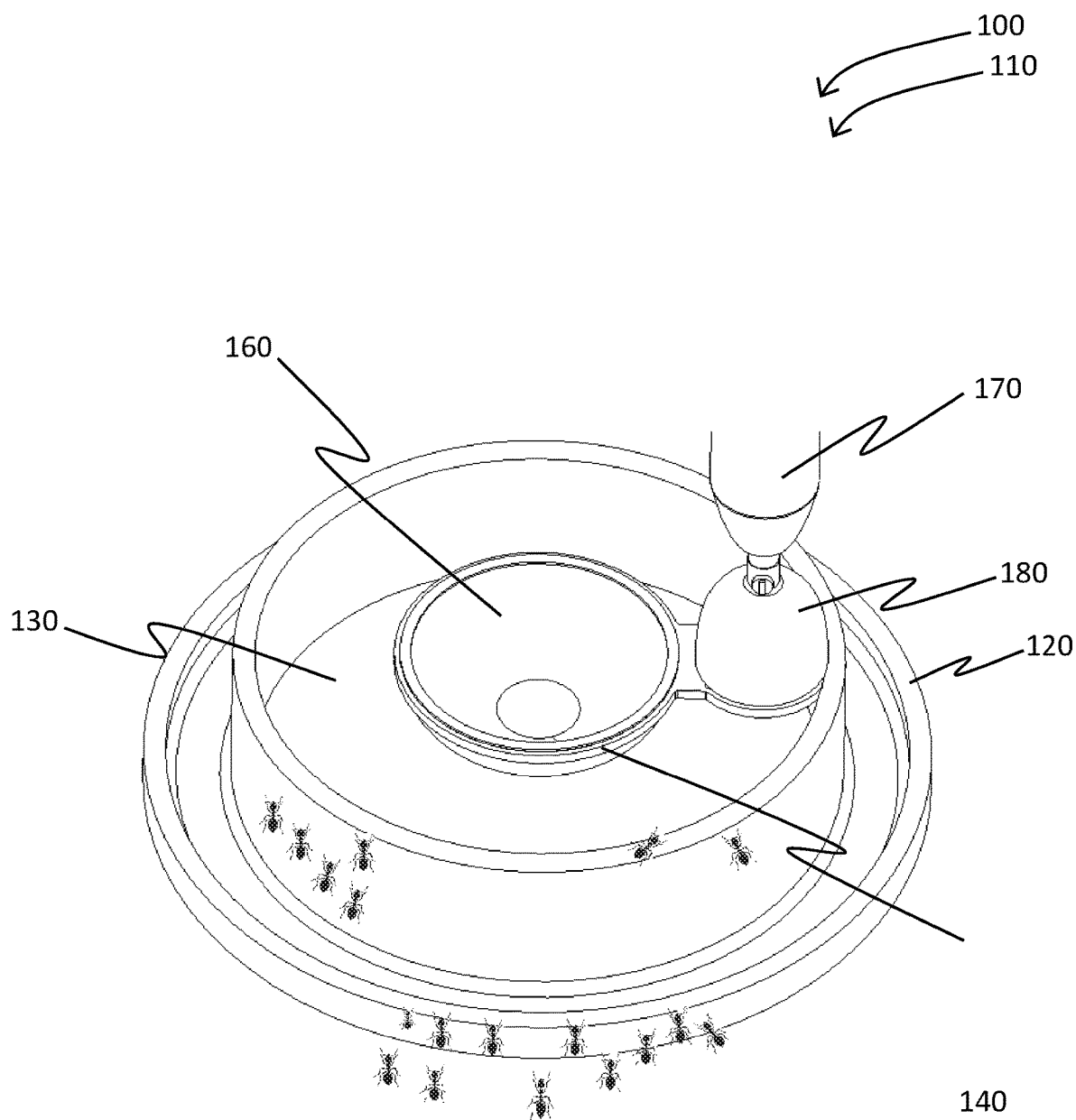
FIG. 5 is a perspective view of the insect-free pet feeder system of FIG. 1, according to an embodiment of the present disclosure.

FIG. 5 shows a perspective view of the insect-free pet feeder system 100 of FIG. 1, according to an embodiment of the present disclosure. As above, the insect-free pet feeder system 100 may include the feeder assembly 110 having the base 120, the water-cavity 130, the pet-food-cavity 140, the bowl insert 160, and the water bottle 170. The base 120 is planar and configured to support the feeder assembly 110 on a ground surface (such as the ground or a floor or the like). The base 120 comprises a textured bottom surface. The base 120 creates the outer lip surrounding the water-cavity 130 and the pet-food-cavity 140.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An insect-free pet feeder system comprising:
   a feeder assembly having
      a base;
      a water-cavity;
      a pet-food-cavity;
      a bowl insert; and
      a water bottle;
   wherein said insect-free pet feeder system comprises said feeder assembly;
   wherein said feeder assembly comprises said base, said water-cavity, said pet-food-cavity, said bowl insert, and said water bottle in functional combination creating a unitary structure;
   wherein said base supports said water-cavity, said pet-food-cavity, said bowl insert, and said water bottle;
   wherein said pet-food-cavity is centrally positioned within and surrounded by said water-cavity;
   wherein said pet-food-cavity comprises an inner volume having a semi-spherical profile configured to receive said bowl insert
   wherein said water bottle is secured to said water-cavity and said pet-food-cavity and is configured to replenish said water-cavity with water and maintain a water level; and
   wherein said water-cavity is configured to provide a moat barrier between insects and pet food stored in said bowl insert located within said pet-food-cavity.

2. The insect-free pet feeder system of claim 1, wherein said bowl insert is removeable.

3. The insect-free pet feeder system of claim 1, wherein said water bottle is refillable.

4. The insect-free pet feeder system of claim 3, wherein said water bottle comprises an opening at a first-end to refill said water bottle.

5. The insect-free pet feeder system of claim 1, wherein said water bottle further comprises a water-release valve for dispensing said water into said water-cavity and maintain said water level.

6. The insect-free pet feeder system of claim 5, wherein said water level is below an outer rim of said pet-food-cavity.

7. The insect-free pet feeder system of claim 6, wherein said outer rim of said pet-food-cavity and an outer rim of said water-cavity are configured on a substantially common horizontal plane.

8. The insect-free pet feeder system of claim 1, wherein said base is planar and configured to support said feeder assembly on a ground surface.

9. The insect-free pet feeder system of claim 1, wherein said base comprises a textured bottom surface.

10. The insect-free pet feeder system of claim 1, wherein said base creates an outer lip surrounding said water-cavity and said pet-food-cavity.

11. The insect-free pet feeder system of claim 1, wherein said water-cavity and said pet-food-cavity comprise a circular 3D profile.

12. An insect-free pet feeder system comprising:
a feeder assembly having
a base;
a water-cavity;
a pet-food-cavity;
a bowl insert; and
a water bottle;
wherein said insect-free pet feeder system comprises said feeder assembly;
wherein said feeder assembly comprises said base, said water-cavity, said pet-food-cavity, said bowl insert, and said water bottle in functional combination creating a unitary structure;
wherein said base supports said water-cavity, said pet-food-cavity, said bowl insert, and said water bottle;
wherein said water-cavity surrounds said pet-food-cavity;
wherein said pet-food-cavity is configured to receive said bowl insert;
wherein said water bottle is secured to said water-cavity and said pet-food-cavity and is configured to replenish said water-cavity with water and maintain a water level;
wherein said water bottle comprises a threaded second-end for coupling to said water-cavity and said pet-food-cavity via a port;
and
wherein said water-cavity is configured to provide a moat barrier between insects and pet food stored in said bowl insert located within said pet-food-cavity.

13. The insect-free pet feeder system of claim 12 wherein said port comprises a threaded-fastener for receiving said threaded second-end of said water bottle.

14. The insect-free pet feeder system of claim 12, wherein said port supports said water bottle in an upright position allowing water to flow to said water-cavity.

15. The insect-free pet feeder system of claim 14, wherein said pet-food-cavity is supported within said water-cavity by a support-member.

16. The insect-free pet feeder system of claim 15, wherein said support-member further supports said water bottle.

17. The insect-free pet feeder system of claim 16, wherein said support-member comprises said port.

18. An insect-free pet feeder system comprising:
a feeder assembly having;
a base;
a water-cavity;
a pet-food-cavity;
a bowl insert; and
a water bottle;
wherein said insect-free pet feeder system comprises said feeder assembly;
wherein said feeder assembly comprises said base, said water-cavity, said pet-food-cavity, said bowl insert, and said water bottle in functional combination creating a unitary structure;
wherein said base supports said water-cavity, said pet-food-cavity, said bowl insert, and said water bottle;
wherein said water-cavity surrounds said pet-food-cavity;
wherein said outer rim of said pet-food-cavity and an outer rim of said water-cavity are configured on a substantially common horizontal plane;
wherein said pet-food-cavity is centrally positioned within said water-cavity;
wherein said pet-food-cavity is configured to receive said bowl insert;
wherein said pet-food-cavity comprises an inner volume having a semi-spherical profile configured to receive said bowl insert;
wherein said bowl insert is removeable;
wherein said water bottle is secured to said water-cavity and said pet-food-cavity and is configured to replenish said water-cavity with water and maintain a water level;
wherein said water bottle is refillable;
wherein said water bottle comprises an opening at a first-end to refill said water bottle;
wherein said water bottle comprises a threaded second-end for coupling to said water-cavity and said pet-food-cavity via a port;
wherein said port comprises a threaded-fastener for receiving said threaded second-end of said water bottle;
wherein said port supports said water bottle in an upright position allowing water to flow to said water-cavity;
wherein said water bottle further comprises a water-release valve for dispensing said water into said water-cavity and maintain said water level;
wherein said water level is below an outer rim of said pet-food-cavity;
wherein said base is planar and configured to support said feeder assembly on a ground surface;
wherein said base comprises a textured bottom surface to prevent relative movement in relation to said ground surface;
wherein said base creates an outer lip surrounding said water-cavity and said pet-food-cavity;
wherein said pet-food-cavity is supported within said water-cavity by a support-member;
wherein said support-member further supports said water bottle;
wherein said support-member comprises said port; and
wherein said water-cavity is configured to provide a moat barrier between insects and pet food stored in said bowl insert located within said pet-food-cavity.

* * * * *